United States Patent [19]
Lala et al.

[11] Patent Number: 5,210,871
[45] Date of Patent: May 11, 1993

[54] INTERPROCESSOR COMMUNICATION FOR A FAULT-TOLERANT, MIXED REDUNDANCY DISTRIBUTED INFORMATION PROCESSING SYSTEM

[75] Inventors: Jaynarayan H. Lala, Wellesley; Stuart J. Adams, Medford, both of Mass.

[73] Assignee: The Charles Stark Draper Labroatory, Inc., Cambridge, Mass.

[21] Appl. No.: 561,362

[22] Filed: Jul. 31, 1990

Related U.S. Application Data

[63] Continuation of Ser. No. 219,987, Jul. 15, 1988, abandoned.

[51] Int. Cl.⁵ .......................... G06F 9/46; G06F 15/16
[52] U.S. Cl. .................................... 395/650; 395/725; 395/325; 340/825.5; 340/825.51; 364/228; 364/228.3; 364/229; 364/241.2; 364/230.1; 364/242.6; 364/271; 364/271.2; 364/DIG. 1
[58] Field of Search ... 364/200 MS File, 900 MS File, 364/187; 395/650, 725, 325, 425, 550; 370/85.2, 85.6, 100.1; 371/8.1, 8.2, 9.1, 68.2; 307/269; 340/825.5, 825.06, 825.51

[56] References Cited

U.S. PATENT DOCUMENTS

| | | | |
|---|---|---|---|
| 4,015,246 | 3/1977 | Hopkins, Jr. et al. | 364/200 |
| 4,257,095 | 3/1981 | Nadir | 364/200 |
| 4,375,639 | 3/1983 | Johnson, Jr. | 364/200 |
| 4,385,350 | 5/1983 | Hansen et al. | 364/200 |
| 4,466,063 | 8/1984 | Segarra et al. | 364/200 |
| 4,497,059 | 1/1985 | Smith | 371/36 |
| 4,499,538 | 2/1985 | Finger et al. | 364/200 |
| 4,633,394 | 12/1986 | Georgion et al. | 364/200 |
| 4,665,522 | 5/1987 | Lala et al. | 371/36 |
| 4,920,486 | 4/1990 | Nielsen | 364/200 |

OTHER PUBLICATIONS

"Completion of the advanced information system", The Charles Stark Draper laboratory Inc., Nov. 12, 1986.
"A fault Tolerant Processor to meet rigorous requirements", J. H. Lala, L. S. Alger, R. J. Gauthier, M. J. Dzwonczyk, Jul. 1986.
"Advanced information processing system", Jaynarayan H. Lala, Sep. 1984.

Primary Examiner—Michael R. Fleming
Assistant Examiner—Gopal C. Ray
Attorney, Agent, or Firm—Robert F. O'Connell

[57] ABSTRACT

A method for resolving access contentions by a plurality of processing sites having the same or different redundancies to a shared communications system wherein the start of the access contention process is first synchronized for all contending sites. A determination is then made of which sites are performing tasks of the highest criticality level and a subsequent determination is made as to which of such highest criticality sites has the highest priority level. Access is then provided to the site having the highest priority level.

9 Claims, 2 Drawing Sheets

INTERPROCESSOR COMMUNICATION FOR A FAULT-TOLERANT, MIXED REDUNDANCY DISTRIBUTED INFORMATION PROCESSING SYSTEM

This is a continuation of copending application Ser. No. 07/219,987 filed on Jul. 15, 1988, now abandoned.

INTRODUCTION

This invention relates generally to information processing systems using distributive, fault-tolerant, multiple processors configured in redundant groups thereof interconnected via a network for permitting communication therebetween and, more particularly, to an effective technique for arbitrating access to the inter-processor network among the redundant processor groups.

BACKGROUND OF THE INVENTION

Many fault tolerant systems have been proposed in order to reduce the risks of processor failures using multiple processors. For example, one type of fault tolerant processor using multiple processors has been disclosed in U.S. Pat. No. 4,497,059 issued to B. Smith on Jan. 29, 1985. An extension of such technique has been proposed in a fault tolerant multiple processor system which utilizes additional processors attached thereto as described in U.S. Pat. No. 4,665,522 issued to J. Lala, et al. on May 12, 1987. Another form of multiprocessor fault tolerant system has been described in U.S. Pat. No. 4,015,246 issued to A. Hopkins, et al. on Mar. 29, 1977. Such systems utilize centralized fault tolerance techniques and suffer from a number of disadvantages which are typical of centralized systems.

For example, the system described in the Smith patent tends to have relatively limited information or data throughput and its applications are for that reason relatively limited also. The system described in the Lala et al patent tends to improve the throughput available with the system of the Smith patent but with a consequent loss in overall reliability of the system.

The multiprocessor system of Hopkins et al. patent also tends to have a higher throughput performance than the fault tolerant processor described in the Smith patent but suffers two major disadvantages. First of all, the system cannot be physically dispersed to any extent; that is, the processors, memories, and I/0 modules which represent the components of the multiprocessor system need to be in relatively close physical proximity for effective operation. Such requirement can be a relatively severe limitation when one wishes to utilize the system in applications where distributed processing at relatively remote locations is required. Secondly, the system described therein forces all information processing tasks to be run in a triplex redundancy mode. Even information processing tasks which have a relatively low criticality cannot be executed in a duplex redundant mode, or in a simplex, i.e., a non-redundant, mode. Moreover, tasks which have relatively high criticality cannot be executed at higher than a triplex redundancy level, e.g., in a quadruplex redundancy mode.

Thus, while the above fault tolerant systems are useful in some applications they are not available for use in the distributed fault tolerant processing sense as is required in many applications.

On the other hand, distributed information processing systems are available for use, for example, in a batch processing environment and can be used only for relatively low, or non-critical, non-fault tolerant and non-real-time, applications. Many commercial networks, for example, which interconnect a number of computers at locations remote from each other are now available so as to provide a form of distributed processing. However, such systems can fail and, in some cases, catastrophically fail, due to a single fault in any of the processors thereof or in the bus system which interconnects the processors. Thus, single-point failures can shut down an entire networked system. Moreover, such systems have relatively low reliability and, in general, as mentioned above, are generally not set up to perform in a real time mode.

In order to obtain both the advantages of distributed processing as well as the advantages of fault tolerance in an overall system, a recently proposed system uses a plurality of redundant processing sites each of which can comprise a plurality of redundant processors which are interconnected by the use of the same number of intersite buses. The processing sites can be physically dispersed so that they can be located relatively far from each other. The multiple processors at each site are loosely coupled, that is, they are not constrained to run in lock-step under control of the same frequency clock. The processors at each processing site can be operated either in a non-redundant, or simplex, mode or in a more complex redundancy mode, the complexity being arranged to be as high as the number of processors present at each site. The overall system is operated so that the level of redundancy need not be the same at all processing sites, the bus system permitting graded redundancies to be accommodated. The overall arrangement is such that the chance that a failed processor will be permitted to disable a bus is greatly reduced.

Such a system is described generally in the following documents: "Advanced Information Processing System," J. H. Lala, CDSL-P-1952, The Charles Stark Draper Laboratory, Inc., September, 1984 and "A Fault-Tolerant Processor To Meet Rigorous Failure Requirements, "J. H. Lala et al., CSDL-P-2705, The Charles Stark Draper Laboratory, Inc. July, 1986.

While such a system has been described generally in the aforesaid documents as providing desirable distributive, fault-tolerant operation, no effective technique has been proposed or devised for suitably managing communication among the processing sites thereof in a manner which appropriately arbitrates the access to an inter-processor communication network by the multiple processing sites involved. It is desirable to be able to provide such an effective network access contention scheme.

BRIEF SUMMARY OF THE INVENTION

In accordance with the invention, an effective interprocessor network access contention technique has been developed, which technique utilizes a polling scheme derived from a Laning poll so as to resolve network contention among different multiple-redundant or simplex processing sites. By the polling technique, processing sites of lower redundancy are first eliminated from contention and then contention among all remaining processing sites having the highest, and equal, redundancies is resolved. The polling technique is devised s that a single failure, or fault, can be tolerated without adversely affecting the operation of any processing site having the highest redundancy and without affecting the ability of such processing site to communicate with one another.

The invention can be described in more detail with the help of the accompanying drawings wherein.

Figure 1:
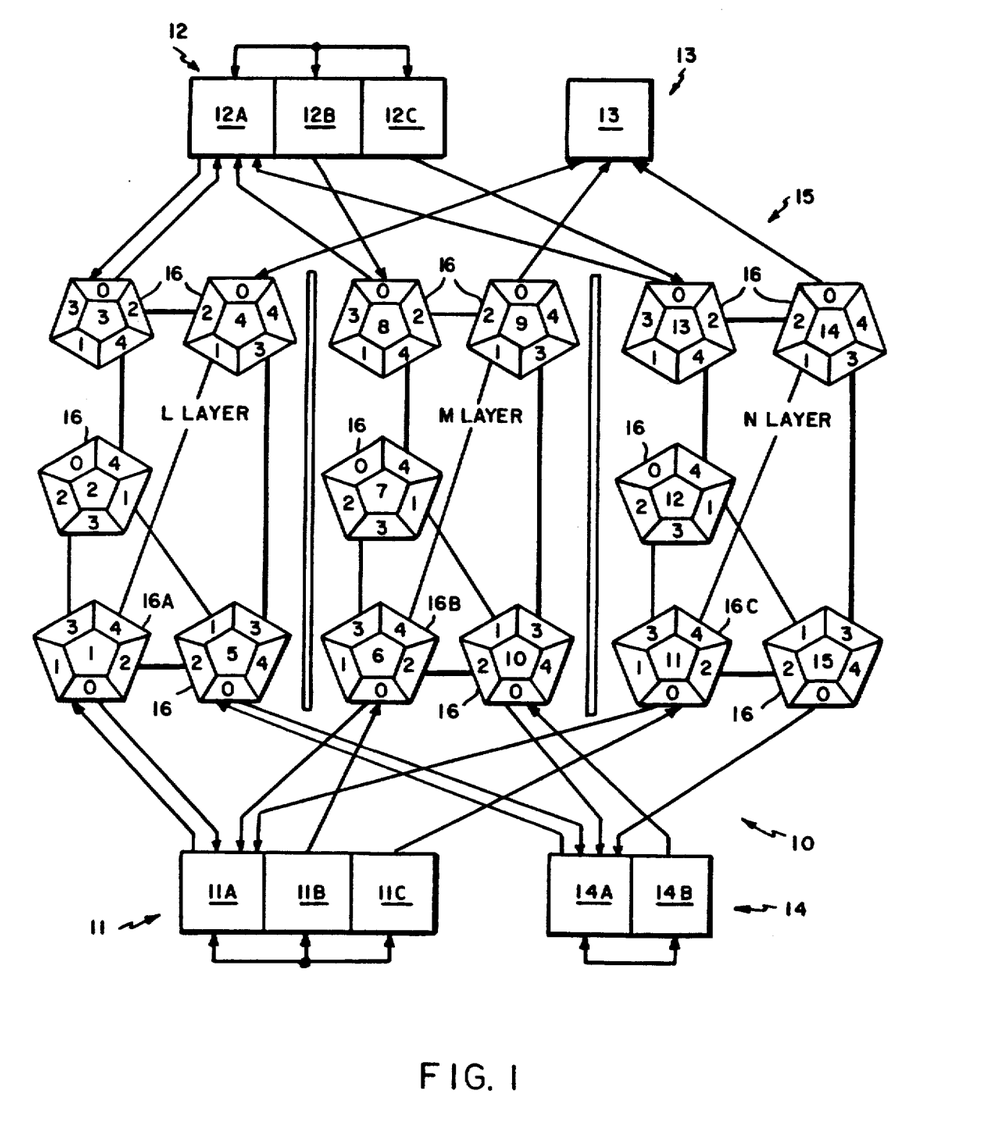
FIG. 1 shows a block diagram of a processing system capable of using the access contention technique in accordance with the invention.

FIG. 1 shows a typical embodiment of a processing system 10 using the access contention scheme of the invention. As seen therein the system comprises four processing sites 11, 12, 13 and 14 in the particular embodiment to be described. Each of the processing sites includes one or more processors, e.g., 11A, 11B and 11C for a triplex redundant site, . . . etc. The processing sites are linked together by a reliable and damage tolerant communication network, or "bus," 15 sometimes referred to hereafter as either an inter-computer (IC) network or IC bus. The processing sites, of course, may be physically dispersed at remote locations from each other. The overall system can be alternatively pictured in the manner shown in FIG. 2.

Thus, each processing site can be thought of as including one or more general purpose computers (GPC) or processors, each of which may operate in a simplex mode, i.e., a processor may operate independently of each of the other processors in the site, with no redundancy involved, or in a more complexly redundant mode. For example, two processors in the site can be arranged to provide duplex redundancy or three processors can be arranged to provide triplex redundancy. Although higher redundancies can be used, for simplicity the system described herein uses as its highest redundancy one or more triplex processing sites.

Throughput at each processor may range from that of a single microprocessor to that of a large multiprocessor or a parallel processor and memory size can be determined by application requirements. An extremely wide range of reliability, as measured by the probability of failure due to random faults, can be provided by the processing sites within the skill of the art, e.g., ranges from approximately $10^{-4}$ per hour for a simplex processor to $10^{-10}$ per hour for a multiprocessor that uses parallel hybrid redundancy.

For those functions requiring fault masking, for example, a triplex level of redundancy is provided. For lower criticality functions or noncritical functions, the processing sites may be duplex or simplex. Parallel hybrid redundancy in a multiprocessor or a parallel processor, for example, can be used for extremely high levels of fault tolerance and/or for long term use. Processing channels of a redundant processor at a processing site are tied together by suitable hardware to provide malicious error, fault-tolerant data exchange, comparison, voting, error masking and channel synchronization, as would be well-known to the art. Redundant processor channels execute identical code in suitable synchronization and processors can also be made damage tolerant by physically dispersing redundant processor elements and providing secure and damage-tolerant communications between these elements.

All of the processors are designed to interface with an inter-computer network or communication medium such that high speed communication between functions located o different processing sites can take place reliably and efficiently. The system can be managed by a System Manager which can be resident in one of the processors. The System Manager allocates functions to individual processing sites, performs system level redundancy management and reconfiguration, and maintains knowledge of the system state for distribution to the component elements. Redundancy management, task scheduling, and other local services at individual processing sites can be handled by local operating systems. System software, distributed across all processing sites, provides such services as intertask communications to applications programs.

Figure 2:
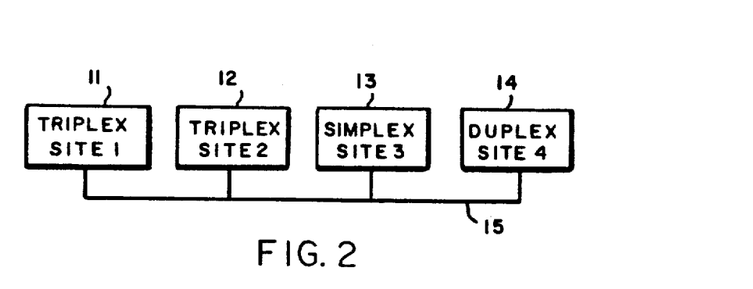
FIG. 2 shows a block diagram illustrating the virtual bus aspect of the system of FIG. 1.

In the system of FIG. 1, the four processing sites shown are interconnected by a three layer, circuit switched network 15. For convenience, the three layers of the network are referred to as network layers L, M, and N. The active links in the network are shown by the solid lines in the figure. In effect FIG. 2 shows the virtual system architecture as seen by a applications programmer, the hardware redundancy being effectively transparent to the user.

For communication between processors and between a processor and input/output (I/0) devices, a damage and fault tolerant network is employed. The network consists of a number of full duplex links that are interconnected by circuit switched multi-ported nodes 16. Each node is identifiable by a node number (shown at the center of each of the fifteen nodes in the particular system depicted) and the ports in each node being also suitably numbered (from 0 to 5 in the exemplary nodes depicted). In a steady state operation, the circuit switched nodes route information along a fixed communication path, or "virtual bus", within the network, without the delays which are associated with packet switched networks. Once the virtual bus is set up within the network, the protocols and operation of the network are similar to typical multiplex buses. Every transmission by any subscriber on a node is heard by all the subscribers on all the nodes just as if they were all linked together by a linear bus.

Although the network essentially performs as a bus (and for that reason is often referred to as a virtual bus), it is far more reliable and damage tolerant than a typical linear bus. A single fault or limited damage can disable only a small fraction of the vital bus, typically a node or a link connecting two nodes. Such an event does not disable the overall network, as would be the case for a linear bus. The network is able to tolerate such faults due to the interconnections between nodes. By reconfiguring the network around the faulty element, a new virtual bus can be constructed. Except for such reconfigurations, however, the structure of the virtual bus remains static.

The nodes are sufficiently intelligent to recognize reconfiguration commands from the network manager, which is resident in one of the processors of the system. The network manager performs the necessary diagnostics to identify the faulted element and can change the bus topology by sending appropriate reconfiguration commands to the affected nodes, as would be known to the art.

The network manager in effect is a management program which is a part of the system software. There is one network manager for each of the three inter-computer network layers. The three layers of the network are used to provide dynamic fault masking capability rather than higher bandwidth as compared to a single network. The three network layer managers operate independently of each other and all may be resident in the same processor or in different processors. The only requirements for a processor to act as host for a given network manager are that the processor have an operating physical connection to the network layer it is managing and that it be at least triply redundant to provide adequate reliability for the network management function. Furthermore, the network manager function can be dynamically migrated to an alternate processor under system manager control if the processor in which the system manager currently resides ceases to meet these requirements.

Figure 3:
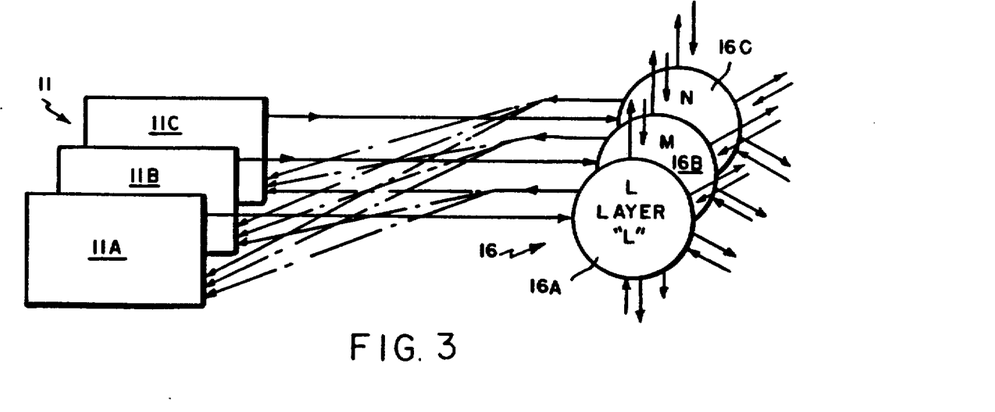
FIG. 3 shows a block diagram depicting the interconnections among the processing group in the system of FIG. 1.

The operation of a system such as shown in FIG. 1, including the operation of the layers and the nodes therein is described in (Reference) and need not be repeated here since such information is already available therein and known to the art. FIG. 3 shows in a different form the interconnections among a typical triplex redundant site (e.g., site 11) and its associated nodes 16 (identified in FIGS. 1 and 3) as modes 16A, 16B and 16C). The nodes in FIG. 4 which are not connected directly to any of the processing sites 11-14 are spare nodes and can be used for connections to an additional processing site if desired.

To maintain the fault-tolerant requirements, each processor channel 11A, 11B and 11C receives data from all three inter-computer network layers but can physically transmit on only one layer, as shown in FIG. 3. A processor does not receive its own transmissions on the network, but does receive the transmissions of all other processors. Once a network communication path has been established through the network, it effectively appears as a serial bus using the HDLC data transmission format. The nodes perform the "OR" of incoming signals such that if any processing site transmits a "1", all processing sites receive a "1". Thus, the network forms a wired-OR HDLC serial bus interconnecting all sites.

All three layers of the network are used together when transmitting and receiving data. Since all processors, i.e., processor channels, of a triplex site are executing the same code synchronously, all three channels (each channel transmitting on a different layer) transmit identical messages. Thus, within some time skew, the redundant layers of the network contain the same message. This operation allows the receiving site to "vote" the three layers, thereby masking any failure. Although always receiving on all three layers, duplex sites can transmit on only two of the three layers of the network, and simplex sites on only one of the three layers.

As mentioned above, the inter-computer circuit switch nodal network comprises three network layers each of which carries identical information. For network access arbitration purposes, the triplex network of layers can be treated as a single entity. Redundant processor groups, regardless of their redundancy level, compete for all three layers of the network. At the end of a contention sequence only one may have access to all three layers of the network. Thus, even if a duplex processor group (or a simplex processor group) wins the network access contention, it is given exclusive use of all three network layers even though it can broadcast on only two of the three layers (or only one of the three layers). In accordance with the access arbitration, or network contention, scheme of the system, higher redundancy groups are given priority over lower redundancy processor groups. Accordingly, triplex processor groups, should be given access priority over duplex or simplex processors. Similarly, duplex processors should have priority over a simplex processor.

Further, in the distributive system of the invention, resolution of network contentions must be arranged to be equitable to all processor groups having like redundancy levels. Over a reasonable period of time, for example, all triplex processor groups should have a equal chance of gaining access to the network and the same for all duplexes and all simplexes.

Moreover, the arbitration technique must be able to resolve actual contention in a reliable manner even in the presence of an arbitrary fault. In other words, a malicious failure in a simplex processor or in one processing channel of a redundant processor groups should not be able to disrupt traffic on more than one network layer. Furthermore, in keeping with the spirit of the distributed nature of the system, the arbitration authority is not centralized, but is distributed throughout the system, and all processing groups wishing to access the network at any given time should arrive at a consensus about what group gains access in a cooperative manner, although in effect independently of each other, and in a manner which preserves network integrity in the face of failures or damage.

In addition, redundant processors, i.e., processing channels, within a particular processing group must arrive at a consensus as to whether or not that group is contending for access to the network bus, and must determine at the end of the contention sequence whether or not the group has gained such access. Contention protocol is arranged so that it does not occur in the processors themselves, but in the inter-computer interface electronics connected to the processors.

The network arbitration process using a Laning poll, as known to the art, is a bit serial algorithm for use in data processing systems for prioritized contention of a serial bus and assumes that multiple processing sites can transmit on the same bus or serial line simultaneously, each site then receiving the "OR" of all bus transmissions. That is, if any site transmits a "1" all sites will receive a "1". Each site contending for the bus has its own unique binary priority vector expressed as P(v1,v2 . . . ,vn) which priority vector is ordered from most significant to least significant bit. A higher number signifies a higher priority. A Laning poll algorithm quarantees that the site with the highest priority will gain access to the bus. The poll consists of sequentially transmitting each priority bit (from most significant to least significant) on the bus. Each site behaves according to the following algorithm during the polling period.

Each processor transmits its first priority vector bit $P_i$ on the bus;

If $P_i=1$ and Received value=1 then the processor continues to transmit the next $P_{i-1}$ If $P_i=1$ and Received value=0 then the processor gains access to the bus.

If $P_i=0$ and Received value=1 then the processor ceases transmitting its P vector.

If $P_i=0$ and Received value=0 then the processor continues to transmit the next $P_{i-1}$ Such algorithm implies that all processing sites on the bus should be synchronized in an appropriate manner so that all sites are transmitting their $i^{th}$ priority bit simultaneously. For this purpose, a "Start" bit can be used to precede the polling sequence in order to ensure synchronization of the polling sequence across all processing sites.

The network contention protocol for the system of the invention can be thought of as a modified form of the Laning poll and comprises two parts, one a redundancy contention sequence (RCS) and the other, a priority contention sequence (PCS). The RCS consists of 3 bits: S, T, and D (denoting Start, Triplex and Duplex bits, respectively), while the PCS consists of three processor group priority bits followed by six processor groups identifier (ID) bits. The purpose of the redundancy contention sequence is to resolve contention between the different levels of redundant elements contending for the bus (i.e. triplex, duplex, or simplex processing groups). At the end of the RCS, all non-failed processing groups still contending for access to the network should be of the same redundancy level. The purpose of the priority contention sequence is thereafter to resolve contention among non-failed processor groups of the same redundancy level according to the priority of the ID bits. The following discussion describes an exemplary polling technique in accordance therewith for use in a system for example, having triplex, duplex and/or simplex processor sites.

In accordance with the redundancy contention sequence, network contention begins with the "S" (Start) bit. In a particular embodiment a processor group may initiate a contention sequence if the network has been idle for a specified time period, e.g., a time period greater than 256 microseconds (μsec) or if the network has been busy for a specified time period since the last contention, e.g. a time period greater than 100 milliseconds (msec).

The first condition is the nominal condition under which a processor group initiates a poll. However, certain other conditions, such as a complete failure of a processor group, also are valid conditions for starting a poll, as exemplified by the second condition. To initiate a network contention poll, a processor group transmits a "1" (the processor group's S bit) on all network layers to which it is connected. Other processor groups may join in the poll sequence during the start bit by transmitting their own S bits. All processing channels, i.e., processors of each processor group, OR the S bits on all three network layers.

Figure 4:
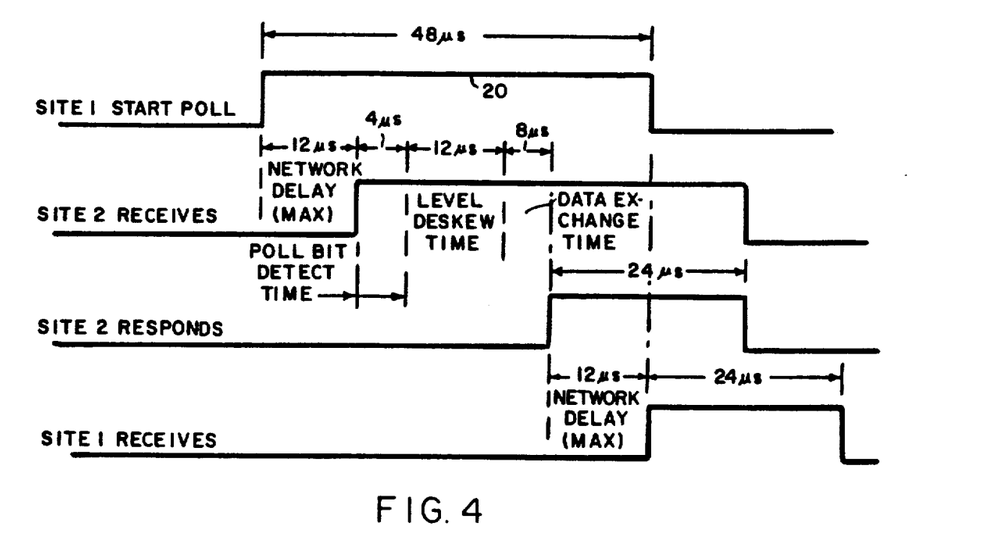
FIG. 4 shows a timing diagram helpful in explaining the synchronizing of processor operations for implementing the access contention scheme of the invention.

Thus, the S bits are distinguishable by being wider, i.e. they have a longer duration, than other bits used in the data link protocol so that they ar not misinterpreted as other data link signals. FIG. 4 shows a typical timing diagram depicting the use of S, or polling, bits. In the figure, simplified so as to show the relationship between two processing sites (e.g. processing sites 1 and 2), it is assumed that site 1 is the site which initiates a contention sequence by putting its start bit 20 on a network layer whereupon it is joined in the polling process by a second processing site 2 which, for purposes of illustration, is located at a maximum number of nodes away from site 1. As shown therein, the initial start bit from site 1 has a selected width, e.g. in the specific example a width of 48 μsec. which is greater than the widths of all subsequent poll bits from other sites, e.g. such latter bits are selected to be 24 μsec. wide. The additional time for the start bit of the site which initiates contention is used by the other receiving sites to identify (detect) the start bit, to compensate for any time skews between network layers and to allow the interface electronics among processings sites to exchange information concerning the detection of the polling event.

Thus, in the particular example shown, site 2 receives the initiation start bit after a maximum network delay of 12 μsec. and is provided with 4 μsec. in which to detect the presence of the start bit and to distinguish it from the longest string of HDLC "1" bits. A further de-skew time of 12 μsec. is provided to allow for the fact that the poll bit may have passed through a maximum number of nodes in one layer and a minimum number of nodes in another layer. In a particular case, for example, each node may produce a delay of about 0.33 μsec., so that a de-skew time of 12 μsec. would allow more than 32 nodes in each network layer.

The interface electronics of each of the processes at site 2 then determine that a contention has begun and exchange that information among all of the redundant processor of site 2 during a data exchange time of 8 μsec. Site 2 then places its start or polling bit on a network layer, site 1 then receiving such bit after a network delay (12 μsec.) and similarly provides the site 2 start bit so that at the end of such processing time the sites (assuming no other site supplies a start bit) are in synchronism ready to start the polling sequence. The S bit thereby serves to synchronize all contending processor groups, or sites, at the beginning of the poll sequence.

All triplex processor groups contending for the network transmit "1"s on all three network layers during the "T" bit part of the redundancy contention sequence. All processor groups, including duplex or lower redundancy types, contending for the network then vote the T bit on the three network layers. If the voted result is a "1", indicating the presence of at least one triplex processor group in the contention sequence, all processor groups not configured as a triplex, i.e., those having a lower redundancy, drop out of the contention sequence. All contending processor groups configured as triplexes then ignore the next RCS bit (the "D" bit) of the sequence and proceed directly to the priority contention sequence (PCS). If only one triplex remains in contention, it should then obtain a voted result of "0" and declare itself the processor group which gains network access. At that point there is no need to go through the rest of the priority contention sequence If duplexes or simplexes obtain a voted result of "0" during the T bit part of the RCS, they can conclude that no triplexes are currently contending for network access and proceed to vote the D bit of the RDS. The "D" (Duplex) bit is used to resolve contention between duplex and simplex processor groups. During the D bit poll, a processor group configured as a duplex transmits a "1" on the two layers to which it is connected. All duplex processors, or channels contending for the network vote the three layers. All simplex processors or channels contending for the network OR the three network layers. If in either case the result is a "1", indicating the presence of one or more duplexes, all processor groups not configured as duplexes, i.e., all simplex processors, drop out of contention. All processor groups configured as duplexes then proceed to the priority contention sequence. If there is only one duplex in contention, it should obtain a voted result of "0" and declare itself as the duplex processor group gaining network access and as before there is no need to go through the rest of the contention sequence. If simplexes obtain a result of "0", during the D bit part of the RCS, they proceed to the priority contention sequence.

The priority contention sequence responds to poll bits from contending processor groups, the poll bits consisting of 3 dynamically valued priority bits and a sufficient number of ID bits to identify all of the processor groups of the system (e.g. 5 ID bits can be used to identify up to 32 processor groups). The dynamic nature of the priority bits can be illustrated as follows. The purpose of providing such a dynamic priority scheme is to assure that, while access is provided to a processor group which is performing a task which is of the highest criticality, other groups performing tasks of the same criticality be given substantially equal access over a relatively long term basis.

Let it be assumed that four processor groups form a system in which such groups will be contending for access, as in the system of FIG. 1 comprising two triplex processing groups, one duplex processor group and one simplex processor. Each processor group is provided with identification information in the form of an identifier number (ID bits). An initial identifier priority is assigned in accordance with the identifier number in that a higher ID number for a processor group represents a higher priority than a lower ID number for a processor group. Higher redundancy groups are assigned the higher ID numbers. Further, all processor groups, of whatever redundancy, are initially assigned a starting dynamic priority number of zero (e.g. "000" for a 3-bit dynamic priority number).

As a specific and relatively simple example to illustrate the use of dynamic priority numbers in the system of FIG. 1, let the ID numbers and dynamic priority bits be initially assigned as follows:

|    | Processor Site | ID    | Dynamic Priority |
|----|---------------|-------|------------------|
| 11 | (Triplex)     | 10001 | 000              |
| 12 | (Triplex)     | 10010 | 000              |
| 13 | (Simplex)     | 00001 | 000              |
| 14 | (Duplex)      | 01001 | 000              |

If processing sites 11, 12 and 14 contend for access, the processor site performing the lower criticality task (simplex site 13) automatically loses, while the higher criticality triplex site 12 wins contention since, although the dynamic priorities of sites 11 and 12 are the same (i.e., 000), the ID number of site 12 is higher than that of site 11. Following such contention the dynamic priority bits of losing sites 11 and 14 are each incremented by one (i.e., to 001), while the dynamic priority, of winning site 12 remains at zero.

If, for example, during a subsequent round of access contention, the same sites 11, 12 and 14 are contending, site 12 automatically loses, since its dynamic priority is at zero, while sites 11 and 14 have dynamic priorities of 001. Site 11 wins contention because, while its dynamic priority is the same as site 14, its ID number is higher. Accordingly, while sites 11 and 12 are each performing tasks of highest but equal criticality (i.e., they are both operating as triplex redundancy sites), the use of dynamic priority bits permits both to have equal opportunity over the time period involved to obtain access, even though site 11 has been originally assigned a lower ID number.

In summary, then, for a contention sequence or processor group or groups executing the higher criticality tasks are determined and initially selected for priority. The value of the dynamic priority bits thereof are then compared and the higher dynamic priority is then selected. If such dynamic priorities are equal, the processor group having the higher identifier number is then selected for contention. In this way, a current losing contender will obtain a dynamic priority over both a current winning contender as well as all current non-contending sites, while the current winning contender still retains its priority over current non-contending sites.

It should also be pointed out that a higher redundancy processor group may not be performing a task having a criticality requiring use of the higher redundancy for that group. For example, a triplex group may be executing a less critical task (one which does not require the highest priority). In such a case, during the redundancy contention sequence, such triplex group will not transmit its "1" during the T bit portion of the sequence but will, in effect, contend as a lower order redundant system, transmitting a "1" during the duplex vote portion of the sequence, if acting as a duplex group, for example.

In the priority contention sequence, the voted, or ORed, results of each of these poll bits are treated in the following manner.

| Triplex Contention | Each processor of a triplex processor group votes the three network layers. |
| Duplex Contention  | Each processor of a duplex processor groups votes the three network layers. |
| Simplex Contention | Each simplex processor ORs the three network layers. |

The contention scheme of the invention is deterministic in nature, i.e., given a set of contending processor groups, the network contention will always result in the same processor group obtaining access to the network. The accessing processor group will be determined in a predetermined maximum length of time because of the deterministic nature of the modified Laning poll algorithm used. In accordance therewith the useful network bandwidth continues to increase with demand until the network is saturated with a further increase in demand, at which point the useful bandwidth stays the same and does not decline.

In the contention scheme of the invention, the "S" bits act as a start bit, indicating the initiation of a poll and all processor groups continue after the start bit. A processor group might drop out during the start bit because of a fault but this should not happen in the fault free case. Moreover, while a faulty network layer can make the network appear to be busy all the time, eventually, after a predetermined time period, i.e., the 100 msec time period discussed above, contention can be re-initiated by any processor group. Such operation could lead, at worst, to 100 msec delays between contention sequences.

During the "T" bit part of the RCS, any single point failure will be dynamically masked. Any single point failure can manifest itself in faulty data in one or all channels on a single layer or it may also manifest itself in the reception of faulty data on all three layers in a single channel.

For triplex groups any single point failure will be dynamically masked, each channel of the triplex voting all three layers. While a single point failure may cause a duplex erroneously to lose contention, it cannot cause the duplex to erroneously continue the contention. A single point failure may cause a simplex to erroneously lose or win the contention, but the failure cannot propagate to another layer of the network.

During the "D" bit, as in the "T" bit, any single point failure can manifest itself in faulty data in one or all channels on a single layer or in the reception of faulty data on all three layers in a single channel. Moreover, an error in a previous "D" bit sequence may have caused a single channel of a triplex group to still be participating in the poll sequence and will at most manifest itself as an error in all channels of a single layer. There may be duplexes and simplexes continuing erroneously in the presence of failure at the end of this bit. A duplex voting a "0" cannot assume that it has won the poll since another duplex could still be contending in the presence of failures.

During the priority contention sequence with reference to triplex groups, any single point failure will be dynamically masked, each channel of the triplex voting all three layers, and then voting the results of their vote (i.e., to continue or to lose contention status). A single point failure may cause a duplex erroneously to lose the contention, but cannot cause the duplex to erroneously continue the contention. A single point failure may cause a simplex to erroneously lose or win the contention, but the failure cannot propagate to another layer of the network.

In summary, during the "S" bit, one and only one erroneous channel may start or continue or dropout erroneously. During the "T" bit, one and only one erroneous channel may continue to contend. During the "D" bit, no duplexes will continue erroneously, Simplexes may erroneously continue on network layers L, M, or N, Simplexes may erroneously drop out on network layers L, M, or N, or Simplexes may erroneously win contention on network layers L, M, or N.

At the end of the "STD" bit sequence of the RCS portion of the polling operation, the following failure modes are exhibited: (1) Duplexes on networks LM, networks LN or networks MN and Simplexes on networks L, M, or N still contending; (2) Triplexes on networks LMN and Simplexes on networks L, M, or N still contending.

To understand better the contention scheme in the presence of a fault, the following example of a simulated fault scenario, which proceeds to a successful completion in the presence of a fault, is described for an exemplary case where there are two triplexes (e.g., Triplex A and Triplex B) and a duplex (Duplex C) contending for the network. Triplex A has the priority vector (1,1), triplex B has the priority vector (0,1), and duplex C has the priority vector (1,0). Triplexes A and B are connected to all three layers, L, M, and N, and duplex C is connected to layers M and N, as summarized below.

| Triplex A | Triplex B | Duplex C |
|---|---|---|
| Priority: 11 | Priority: 01 | Priority: 10 |
| Layers: LMN | Layers: LMN | Layer: MN |

As an exemplary fault, let it be assumed all channels at all sites always receive a "1" from layer L (e.g. a fault has occurred in the inter-computer IC node layer L transmitters). The polling sequence proceeds as follows.

| Triplex A | Triplex B | Duplex C |
|---|---|---|
| "S" BIT | | |
| Xmit "1" on LMN | Xmit "1" on LMN | Xmit "1" on MN |
| Rcv L=11, M=1, N=1 | Rcv L=1, M=1, N=1 | Rcv L=1, M=1, N=1 |
| Start Contending | Start Contending | Start Contending |
| "T" BIT | | |
| Xmit "1" on LMN | Xmit "1" on LMN | Xmit "0" on MN |
| Rcv L=11, M=1, N=1 | Rcv L=1, M=1, N=1 | Rcv L=1, M=1, N=1 |
| Voted LMN="1" | Voted LMN="1" | Voted LMN="1" |
| Continue | Continue | Drop Out |
| (Proceed to priority sequence bits) | | |
| PBIT1 | | |
| Xmit "1" on LMN | Xmit "0" on LMN | |
| Rcv L=1, M=0, N=0 | Rcv L=1, M=1, N=1 | |
| Voted LMN = "0" | Voted LMN = "1" | |
| Win Network | Drop Out | |

As expected, triplex A having the higher priority vector (1,1) wins the network contention after the first priority bit.

The following is an example of a simulated fault scenario which does not proceed to a successful completion in the presence of a fault, e.g., where a duplex erroneously wins the network. Where there are two duplexes and a simplex contending for the network. Duplex A has the priority vector (1,1), Duplex B has the priority vector, (0,1), and Simplex C has the priority vector (1,0).

Duplexes A and B are connected to layers, M and N, and Simplex C is connected to layer L.

| Duplex A | Duplex B | Simplex C |
|---|---|---|
| Priority: 11 | Priority: 01 | Priority: 10 |
| Layers: MN | Layers: MN | Layer: N |

For an exemplary fault: Duplex B and Simplex C always receive a "0" from layer N (e.g., a fault has occurred in the inter-computer N transmitter).

| Duplex A | Duplex B | Simplex C |
|---|---|---|
| "S" BIT | | |
| Xmit "1" on MN | Xmit "1" on MN | Xmit "1" on N |
| Rcv L=1, M=1, N=1 | Rcv L=1, M=1, N=1 | Rcv L=1, M=1, N=1 |
| Start Contending | Start Contending | Start Contending |
| "T" BIT | | |
| Xmit "0" on MN | Xmit "0" on MN | Xmit "0" on N |
| Rcv L=0, M=0, N=0 | Rcv L=0, M=0, N=0 | Rcv L=0, M=0, N=0 |
| Voted LMN="0" | Voted LMN="0" | Voted LMN="0" |
| Continue | Continue | Continue |
| "D" BIT | | |
| Xmit "1" on MN | Xmit "1" on MN | Xmit "1" on N |
| Rcv L=0, M=1, N=1 | Rcv L=0, M=1, N=0 | Rcv L=0, M=1, N=0 |
| Voted LMN="1" | Voted LMN="0" | ORed LMN="1" |
| Continue | win contention | Drop Out |
| (Proceed to priority sequence bits) | | |
| PBIT1 | | |
| Xmit "1" on MN | | |
| Rcv L=0, M=1, N=0 | | |
| Voted LMN="0" | | |
| Win Network | | |

Thus, so long as triplex, or higher, redundancy is used in the system, the access contention scheme of the invention used in the system can handle the presence of a "malicious" (or Byzantine) fault anywhere in the system. However, although fault-masking can be guaranteed for contention and communication between triplexes, for processor groups of lower redundancy, such fault-masking cannot be guaranteed. Since the interconnectivity of duplex and simplex sites does not satisfy the rigorous theoretical requirements for handling "malicious" faults, few assumptions can be made about their ability to communicate under faulty conditions. However, since communication between triplexes is guaranteed and since a network manager can be arranged so as to operate always on a triplex processing site, communication should be able to be restored after diagnosis and reconfiguration by the network manager.

It should be pointed out that while the access contention scheme of the invention has been described for use in the context of a particular system, such as shown in FIG. 1 using interconnection networks, the scheme can be used in any system using a shared communication means between the procesing sites, such as, for example, a shared bus communication system.

What is claimed is:

1. A method for use in a system which includes a plurality of processing sites for performing tasks having criticality levels which range from a highest criticality level to lower criticality levels, said processing sites having priority levels which range from a highest priority level to lower priority levels, and means for providing shared communication among the processing sites, the processing sites having the same or different redundancies, said method providing a process for resolving contentions among more than one processing site for access to the shared communication means and comprising the steps of
   (1) providing a starting signal from each processing site contending for access to each other processing site to synchronize the start of the process for resolving access contention;
   (2) determining which of the contending processing sites have the same highest redundancy for performing tasks having the highest criticality levels;
   (3) determining the highest priority level of the processing sites determined in step (2); and
   (4) providing access to said shared communication means to the processing site having said highest priority level.

2. A method in accordance with claim 1 and further including the steps of
   (2A) determining, only if step 2 determines that none of the contending processing sites has the same highest possible redundancy for performing tasks having the highest criticality level, which, if any, of the contending processing sites has the same next highest redundancy for performing tasks having the next highest criticality level;
   (2B) repeating step (2A) for each successive redundancy and criticality level until the contending processing sites which have the same redundancy for performing tasks having the highest criticality level of the contending processing sites has been determined.

3. A method for use in a system which includes a plurality of processing sites for performing tasks having dynamic criticality level which range from a highest dynamic criticality level to lower dynamic criticality levels, said processing sites having dynamic priority levels which range from a highest dynamic priority level to lower dynamic priority levels and identifier numbers which range from a highest identification number to lower identification numbers, and means for providing shared communication among the processing sites, each processing site having the same or different redundancies, said method providing a process for resolving contention among more than one processing site for access to the shared communication means and comprising the steps of
   (1) providing a starting signal from each processing site contending for access to each other processing site to synchronize the start of the process for resolving access contention;
   (2) determining which of the contending processing sties have the same highest redundancy for performing tasks having the highest criticality level;
   (3) determining, for each of the contending highest criticality processing sites having the same highest redundancy, a dynamic priority level and a processing site identifier number;
   (4) determining which of the highest criticality processing sites having the same highest redundancy has the highest dynamic priority level;
   (5) determining, only if more than one highest criticality processing site having the same highest redundancy have the same highest dynamic priority level, which processing site has the highest identifier number; and
   (6) providing access to said shared communication means to the one highest criticality processing site having the same highest redundancy which has the highest dynamic priority level or to the highest criticality processing site having the same highest redundancy which has the highest identifier number if more than one said site has the same dynamic priority level.

4. A method in accordance with claims 1 or 3 wherein the system includes at least one or more processing sites having a triplex redundancy wherein said triplex redundancy is the highest redundancy, whereby a single malicious fault anywhere in the system can be handled by said system.

5. A method in accordance with claim 3 and further including the steps of
   (2A) determining, only if step 2 determines that none of the contending processing sites has the same highest possible redundancy for performing tasks having the highest criticality level, which, if any, of the contending processing sites has the same next highest redundancy for performing tasks having the next highest criticality level;
   (2B) repeating step (2A) for each successive redundancy and criticality level unitl the contending processing sites which have the same redundancy for performing tasks having the highest criticality level of the contending processing sites has been determined.

6. A method in accordance with claim 5 and further including the steps of pre-determining the identifier numbers and pre-assigning a zero dynamic priority level for all processing sites of the system.

7. A method in accordance with claim 6 and further including the step of incrementing the dynamic priority level of a contending processing site which has not been provided access to the shared communication means by one priority level.

8. A method in accordance with claim 3, and further including the steps of pre-determining the identifier numbers of said processing sites and pre-assigning a zero dynamic priority level for all processing sites of the system.

9. A method in accordance with claim 8 and further including the step of incrementing the dynamic priority level of a contending processing site which has not been provided access to the shared communication means by one priority level.

* * * * *